Aug. 23, 1927.
D. D. TRACY
1,639,867
SECTIONAL CONDUIT
Filed Nov. 18, 1925
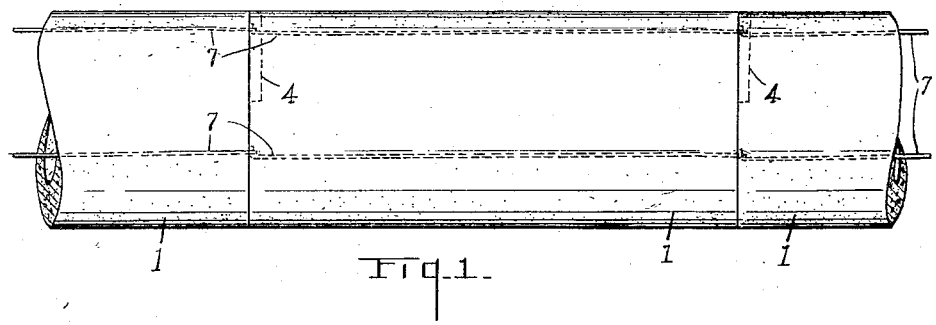
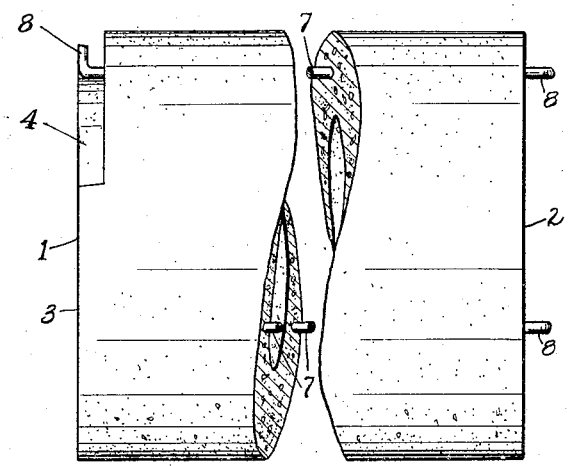
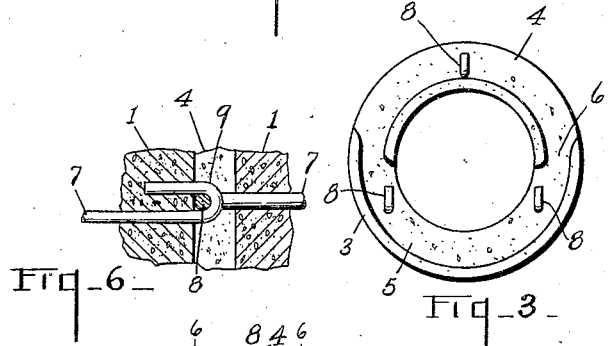
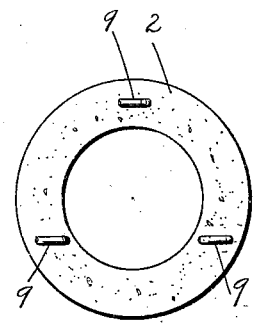
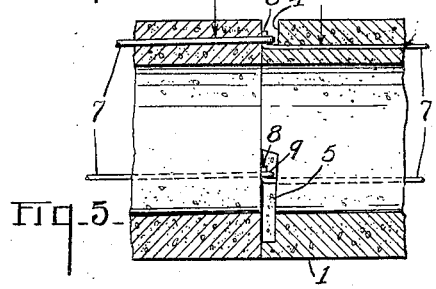
INVENTOR
David D. Tracy
BY Chappell & Earl
ATTORNEYS Patented Aug. 23, 1927.

1,639,867

UNITED STATES PATENT OFFICE.

DAVID D. TRACY, OF JACKSON, MICHIGAN.

SECTIONAL CONDUIT.

Application filed November 18, 1925. Serial No. 69,887.

This invention relates to improvements in sectional conduits.

The main object of this invention is to provide an improved joint for sectional conduits which is well adapted for conduits of large size such as water mains, sewers and the like which facilitates the laying of the conduit and provides a very secure joint.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which:

Fig. 1 is a fragmentary side elevation of a conduit embodying the features of my invention.

Fig. 2 is a fragmentary side elevation of one of the conduit sections.

Fig. 3 is an end view looking from the left at Fig. 2.

Fig. 4 is an end view looking from the right at Fig. 2.

Fig. 5 is a fragmentary vertical longitudinal section.

Fig. 6 is an enlarged detail section on a line corresponding to line 6—6 of Fig. 5.

In the accompanying drawing I have not attempted to maintain the relative proportion of the parts, that is, the thickness of the walls, diameter of the coupling rods and the like.

The conduit sections 1, preferably formed of concrete, are provided with a flat end face 2 at one end and a channeled joint face 3 at the other end, there being an external joint channel 4 and an internal joint channel 5. These channels communicate at their ends as at 6. The sections are laid end to end in abutting relation and these joint channels are filled with cement, asphalt or other suitable joint sealing material.

Each section is provided with coupling rods 7, the rods being embedded in the body of the section and terminating at one end in upwardly facing hooks 8 and at the other end in loop eyes 9. The hooks 8 project into the channels with their ends flush with the face of the section. The eyes 9 project from the end face 2 of the channel in a horizontal direction to be engaged with the hooks as shown in Figs. 5 and 6, the eyes being a relatively close fit and resting on the shanks of the hooks when the sections are in alined position, thus securing the parts together in alined position. When the channels are filled the engaging parts are embedded.

By thus arranging the coupling members they may be easily engaged in the laying of the conduit and serve to guide and support the parts in alinement during the laying of the conduit and while the earth is being properly filled in around the sections. Of course, it is not intended that the entire supporting strain of the section shall be borne by the coupling members. They are, however, effective in alining the parts and preventing them pulling apart both in laying and thereafter.

My improved conduit is simple and economical to manufacture and particularly well adapted for use in conduits of large size.

Having thus described my invention what I claim as new and desire to secure by Letters Patent is:

1. A sectional conduit comprising tubular sections each having a flat face at one end and a channeled face at the other end there being an external top joint channel and an internal bottom joint channel, said channels communicating at their ends, and tie rods embedded in said sections and having vertically disposed hooks projecting into the joint channels with their ends flush with the channeled end face of the section, and horizontally disposed eye loops at their other ends projecting from the flat face of the section and engaging the hooks of an abutting section and resting on the shanks thereof, the ends of the hooks abutting the flat face of the abutting section.

2. A sectional conduit comprising tubular sections, each section having a flat face at one end and an external top joint channel and an internal bottom joint channel at the other end, coupling hooks projecting into said joint channels with their bills disposed vertically and flush with the end of a section, and eyes projecting from the flat face end of the section engaging with the bills of a coacting section, the eyes having a relatively close sliding engagement with the bills and engaging the shanks of the hooks when the sections are alined.

3. A conduit section having a flat face at one end and internal and external top and bottom joint channels at the other end and tie rods embedded in said section and having upwardly facing hooks projecting into the channels with their ends flush with the end of the section, and horizontally disposed eyes projecting from its flat face end adapted to be engaged with the hooks of an abutting section.

4. A conduit section having a flat face at one end and a channeled face at the other end there being an external top joint channel and an internal bottom joint channel, said channels communicating at their ends, and tie rods embedded in said sections and having vertically disposed hooks projecting into the joint channels with their ends flush with the channeled end face of the section, and horizontally disposed eye loops at their other ends projecting from the flat face of the section.

5. A conduit section having a flat face at one end and an external top joint channel and an internal bottom joint channel at the other end, coupling hooks projecting into said joint channels with their bills disposed vertically and flush with the end of a section, and eyes projecting from the flat end of the section adapted to be engaged with the bills of a coacting section.

In witness whereof I have hereunto set my hand.

DAVID D. TRACY.